United States Patent [19]
Davis et al.

[11] Patent Number: 5,728,945
[45] Date of Patent: Mar. 17, 1998

[54] ELECTROMAGNETIC FLOWMETER WITH INTERNALLY PLACED, LAMINAR FLOW SUPPORTING, GROUNDING ELECTRODES

[75] Inventors: James W. Davis, New Britain; Herbert A. Shauger, Jr., Doylestown; Gabor E. Vass, Hatfield, all of Pa.

[73] Assignee: Elsag International N.V., Amsterdam, Netherlands

[21] Appl. No.: 781,352

[22] Filed: Jan. 21, 1997

[51] Int. Cl.$^6$ ............................................. G01F 1/58
[52] U.S. Cl. .................... 73/861.12; 73/861.15; 73/861.08
[58] Field of Search ................... 73/861.12, 861.15, 73/861.08

[56] References Cited

U.S. PATENT DOCUMENTS

| | | | |
|---|---|---|---|
| 3,746,896 | 7/1973 | Gruner | 73/861.12 X |
| 3,754,824 | 8/1973 | Mannherz et al. | 73/194 |
| 4,195,515 | 4/1980 | Smoll | 73/861.15 X |
| 4,351,189 | 9/1982 | Gray et al. | 73/861.15 X |
| 4,434,667 | 3/1984 | August et al. | 73/861.12 |
| 4,688,432 | 8/1987 | Marsh | 73/861.15 |

FOREIGN PATENT DOCUMENTS 3247003  6/1984  Germany.

*Primary Examiner*—Elizabeth L. Dougherty
*Attorney, Agent, or Firm*—Andrew L. Ney; Michael M. Rickin

[57] ABSTRACT

An electromagnetic flowmeter comprising a body having a central channel having a measuring region, an inlet region and an outlet region. Relative to liquid flow through the central channel, the inlet region is upstream of the measuring region, and the outlet region is downstream of the measuring region. The inlet region and outlet region have diameters substantially greater than the diameter of the measuring region. A transition region extends between the inlet region and the measuring region, and a transition region extends between the measuring region and the outlet region. First and second cavities are respectively positioned in the inlet region and the outlet region, and third and fourth diametrically opposed cavities extend from the measuring region of the central channel. First and second grounding electrodes are respectively positioned in the first and second cavities, and third and fourth measuring electrodes are respectively positioned in the third and fourth cavities.

2 Claims, 2 Drawing Sheets

1

ELECTROMAGNETIC FLOWMETER WITH INTERNALLY PLACED, LAMINAR FLOW SUPPORTING, GROUNDING ELECTRODES

BACKGROUND OF THE INVENTION

This invention relates generally to electromagnetic flowmeters, and more particularly to an electromagnetic flowmeter having internally placed grounding electrodes which do not interface with the laminar flow characteristics of a liquid.

The operation of an electromagnetic flowmeter is based on Faraday's law of electromagnetic induction, which is described in detail in the U.S. Pat. No. 3,745,824. Applying Faraday's law, a flow rate may be measured by allowing the liquid of interest to be passed through a magnetic field, thereby producing a voltage which can be detected by diametrically opposed electrodes and converted into a flow rate signal. Since the induced voltage is proportional to the average velocity of the liquid, the electromagnetic flowmeter can be calibrated to indicate the volumetric flow rate of the liquid passing through it.

Because the accuracy of a reading depends on detection of the voltage created by the liquid passing through the magnetic field, it is important to remove stray electrical leakage currents, or electrical noise, from the liquid so that the only voltage detected is that which is created by the passage of the liquid through the magnetic field. Fluctuations of noise within the liquid, in proximity to electrical equipment, can build up as the liquid flows through pipe, hose, other instruments, etc. prior to entering the flowmeter. This electrical noise causes inaccurate induced voltage readings, and should be eliminated to achieve accurate flow rate readings.

The noise may be eliminated by grounding the liquid just prior to it reaching the measuring electrodes. By placing grounding electrodes in the flow stream upstream and downstream of the measuring electrodes, the liquid may be bonded to a ground potential. This results in an accurate reading of the induced voltage, because the only voltage picked up by the measuring electrodes is that which occurs as a result of the movement of the liquid through the magnetic field. The closer the grounding electrodes are to the measuring electrodes, within practical limits, the less likely stray voltage or noise will be present in the liquid as it flows past the measuring electrodes.

A problem, however, arises when the grounding electrodes are placed too close to the measuring electrodes. The known prior art has the grounding electrodes extending into the flow stream. The upstream grounding electrode consequently creates eddies as the liquid flows past it. This creation of turbulence also creates a noise condition. As previously stated, noise causes inaccurate readings. The existence of turbulence also means that the liquid passing the measuring electrodes has a fluctuating and unpredictable flow profile. A fluctuating and unpredictable flow profile results in a less accurate reading of average velocity than would be the case for a known steady state flow profile. Thus, it is desirable to minimize the turbulence created by the grounding electrodes. In fact, it is desirable that the liquid to be measured demonstrates laminar flow characteristics as it passes between the measuring electrodes to insure the most accurate measurement.

SUMMARY OF THE INVENTION

Accordingly, an electromagnetic flowmeter, constructed in accordance with the present invention, includes a body having a central channel having a measuring region, and an inlet region and an outlet region, relative to liquid flow through the central channel, upstream and downstream of the measuring region, respectively. The inlet region and the outlet region have diameters substantially greater than the diameter of the measuring region. A transition region extends between the inlet region and the measuring region, and a transition region extends between the measuring region and the outlet region. The flowmeter, constructed in accordance with the present invention, also includes first and second cavities extending from the inlet region and the outlet region of the central channel, respectively, and third and fourth diametrically opposed cavities extending from the measuring region of the central channel. Also included are means for developing a magnetic field extending through the measuring region of the central channel, and first and second grounding electrodes positioned in the first and second cavities, respectively, and third and fourth measuring electrodes positioned in the third and fourth cavities, respectively.

DETAILED DESCRIPTION OF THE INVENTION

Figure 1:
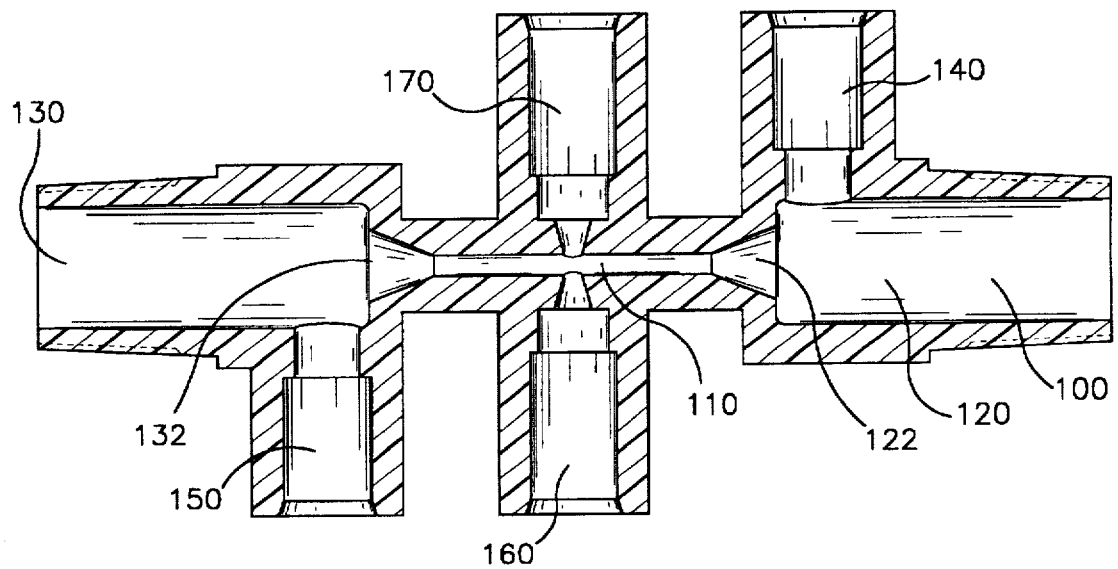
FIG. 1 is a cross sectional view of a flowmeter body constructed in accordance with the present invention.
Figure 2:
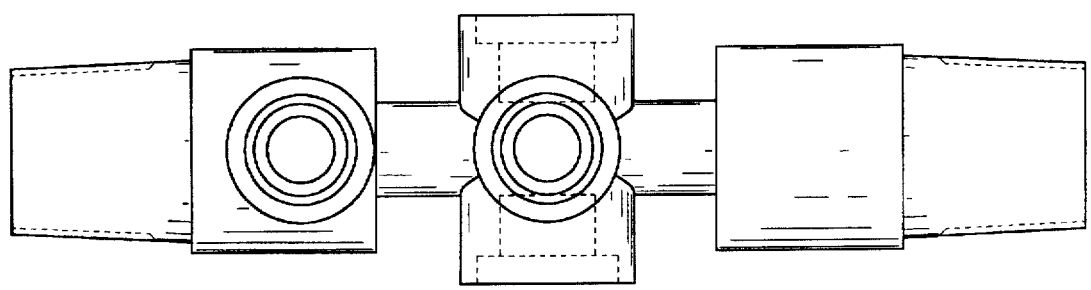
FIG. 2 is a side view of the flowmeter body of FIG. 1.

Referring to FIGS. 1 and 2, an electromagnetic flowmeter, constructed in accordance with the present invention, includes a body having a central channel 100 having a measuring region 110, an inlet region 120, and an outlet region 130. Relative to liquid flow through the central channel, inlet region 120 is upstream of measuring region 110 and outlet region 130 is downstream from measuring region 110. The inlet region 120 and the outlet region 130 have diameters substantially greater than the diameter of the measuring region 110. A transition region 122 extends between the inlet region 120 and the measuring region 110, and a transition region 132 extends between the measuring region and the outlet region 130.

The transition regions 122 and 132 each have a minimum diameter equal to the measuring region 110 diameter, and a maximum diameter equal to the inlet and outlet region diameters, respectively. The length of each transition region is calculated to prevent the separation of liquid streams (i.e. maintain laminar flow) as liquid enters the measuring region. In the present invention, the angle formed between opposite lines along the transition region wall is less than or equal to 18 degrees. In other words, the angle formed by the longitudinal axis of the channel 100 and the wall of the transition region is less than or equal to 9 degrees. The length of the transition region need be only long enough to support laminar flow into the measuring region. A limiting factor on the length of the transition region is the overall length of the flowmeter. The longer the transition regions, the longer the flowmeter. Moreover, an optimum length is selected based on overall flowmeter length requirements while still allowing for laminar flow into the measuring region.

The electromagnetic flowmeter also includes first and second cavities 140 and 150 extending from the inlet region 120 and the outlet region 130 of central channel 100, respectively, and third and fourth diametrically opposed cavities 160 and 170 extending from the measuring region 110 of the central channel 100.

Figure 3:
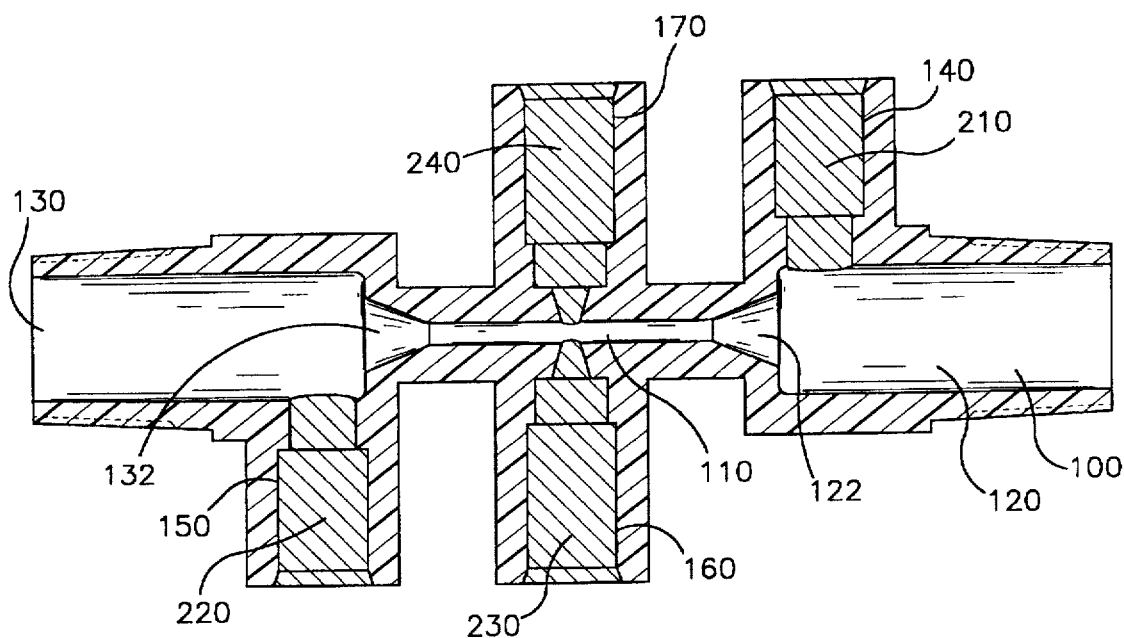
FIG. 3 is a cross sectional view of a flowmeter constructed in accordance with the present invention, with electrodes in place.

FIG. 3 shows the electromagnetic flowmeter with electrodes in place. First and second grounding electrodes 210 and 220 are positioned in the first and second cavities 140 and 150, respectively. Third and fourth measuring electrodes 130 and 140 are positioned in the third and fourth cavities 160 and 170, respectively.

Figure 4:
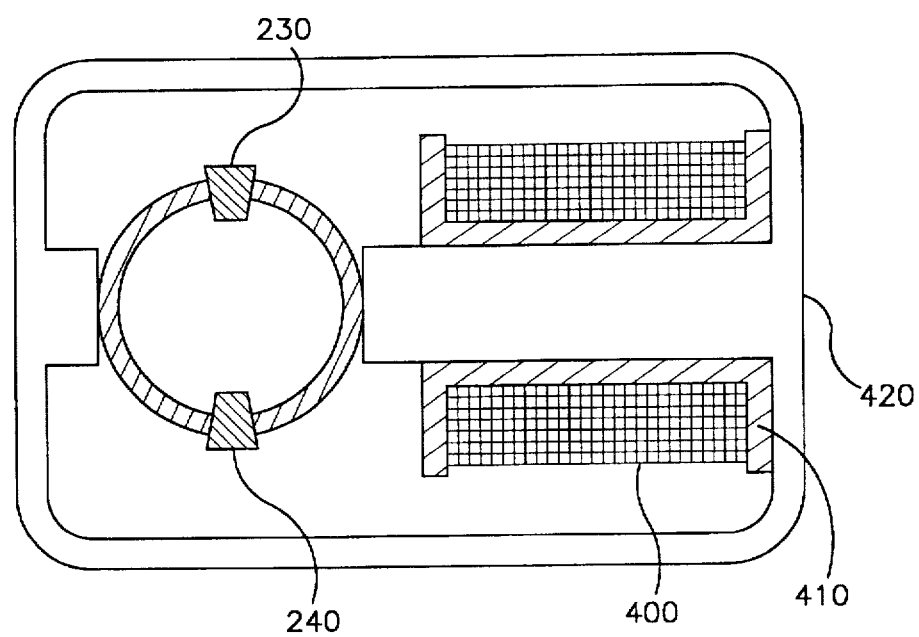
FIG. 4 is a cross sectional view of apparatus for developing a magnetic field which extends through the flowmeter of FIG. 3.

Completing the flowmeter apparatus is a means for developing a magnetic field extending through the measuring region 110 of central channel 100. FIG. 4 shows an apparatus commonly used for creating this magnetic field. The apparatus consists of a conductive wire 400, coiled around a spool piece 410. A current is passed through the conductive wire 400 and the magnetic field generated is focused, via a yoke 420, across measuring region 110, perpendicular to both the flow path and the longitudinal axis of the measuring electrodes 230 and 240.

The grounding electrodes 210 and 220 extend into the central channel 100 only very slightly (from 0 to ⅓ the diameter of the central channel 100 at its widest diameter). This eliminates or considerably reduces the interruption of the liquid as it passes through the flowmeter, and eliminates or considerably reduces the creation of turbulence just prior to where the liquid enters the measuring region 110. The placement of the grounding electrodes 210 and 220 in the larger diameter regions of central channel 100 means the electrodes are in relatively low velocity flow regions (relative to the measuring region flow velocity). This lower average velocity allows a large surface area of the grounding electrodes without undue distortion of the flow profile in the measuring region. Moreover, by placing the grounding electrodes 210 and 220 outside the measuring region 110 and in a relatively low velocity region of central channel 100, adequate grounding is performed without the introduction of turbulence in the liquid.

Traditionally, the smaller the flow area through a flowmeter, (i.e. the diameter of the flow channel), the more difficult it becomes to obtain adequate surface area in contact with the liquid for grounding without invading the flow channel and creating undesirable flow turbulence in the measurement region. Where the flow area was larger, the grounding electrodes could extend less into the channel because the diameter of the grounding electrode could be made accordingly larger and still fit into the flow channel without obstructing flow. Because of this trade-off, small channel flow meters, if the electrodes were placed inside, often had turbulent flow through the measuring area because the electrodes had to extend into the channel far enough to achieve the required minimum surface area contact.

The traditional solution to this problem was to locate the grounding electrodes outside of the flowmeter, in a larger diameter pipe. This solved some of the turbulence problem, but as discussed previously, the further the grounding electrodes are from the measuring area, the more likely an inaccurate reading will result. The present invention, however, solves both of these problems by placing the grounding electrodes inside the flowmeter body near the measuring area, but in a channel of somewhat greater diameter than the measuring area diameter. Thus, the required surface area exposure of the grounding electrodes is achieved without extending the electrodes into the flow channel so far as to create undesired turbulence.

Although the present invention has been described with reference to exemplary embodiments, it is not limited thereto. Rather, the appended claims should be construed to include other variants and embodiments of the invention which may be made by those of ordinary skill in the art without departing from the true spirit and scope of the present invention.

What is claimed:

1. An electromagnetic flowmeter comprising:
   a body having a central channel having:
   (a) a measuring region,
   (b) an inlet region and an outlet region, relative to liquid flow through said central channel, upstream and downstream of said measuring region, respectively, said inlet region and said outlet region having diameters substantially greater than the diameter of said measuring region, and
   (c) a transition region extending between said inlet region and said measuring region and a transition region extending between said measuring region and said outlet region;
   first and second cavities, respectively, extending from said inlet region and said outlet region of said central channel;
   third and fourth diametrically opposed cavities extending from said measuring region of said central channel;
   means for developing a magnetic field extending through said measuring region of said central channel;
   first and second grounding electrodes, respectively, positioned in said first and second cavities; and
   third and fourth measuring electrodes, respectively, positioned in said third and fourth cavities.

2. A flowmeter according to claim 1, wherein the angle formed by said transition region wall and the longitudinal axis of said central channel is no greater than 9 degrees.

* * * * *